April 16, 1940.  C. V. DEWAR  2,197,099
PIPE BEADING APPARATUS
Filed Sept. 6, 1938
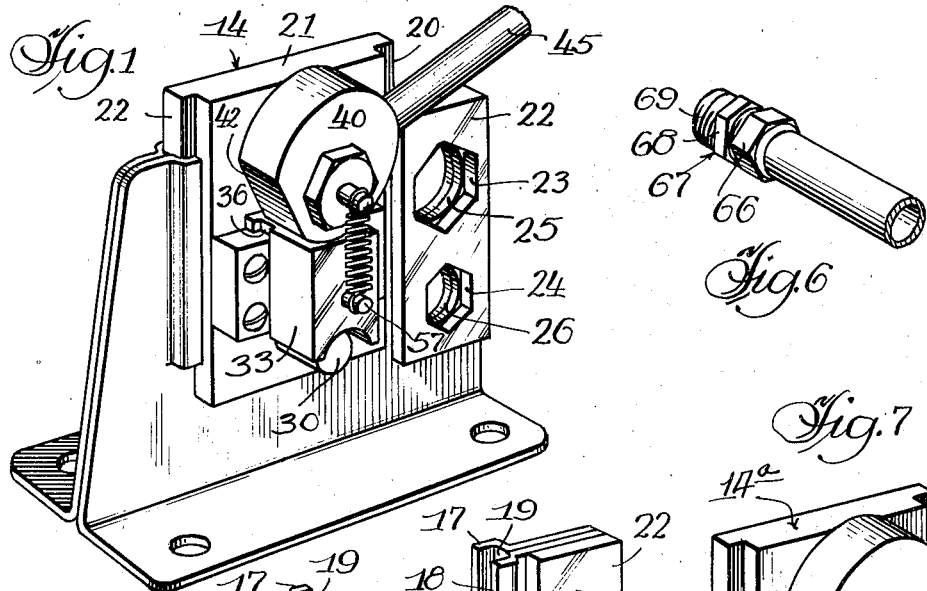
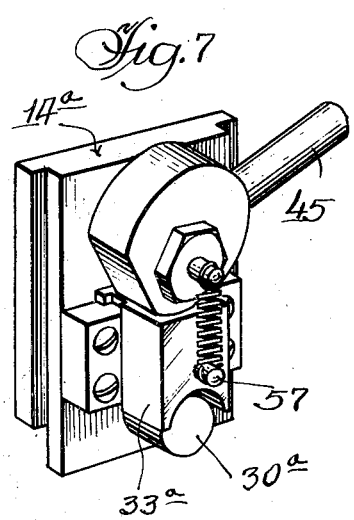
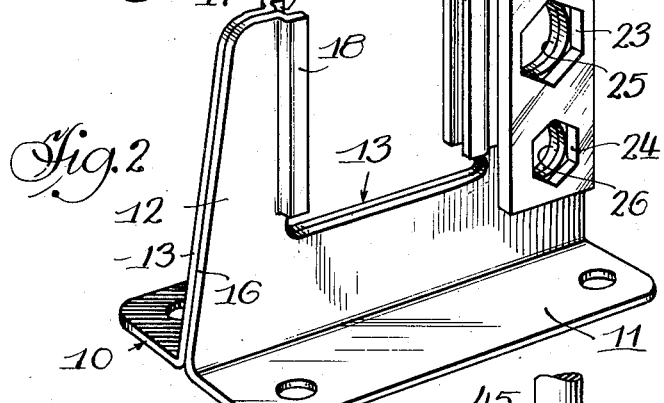
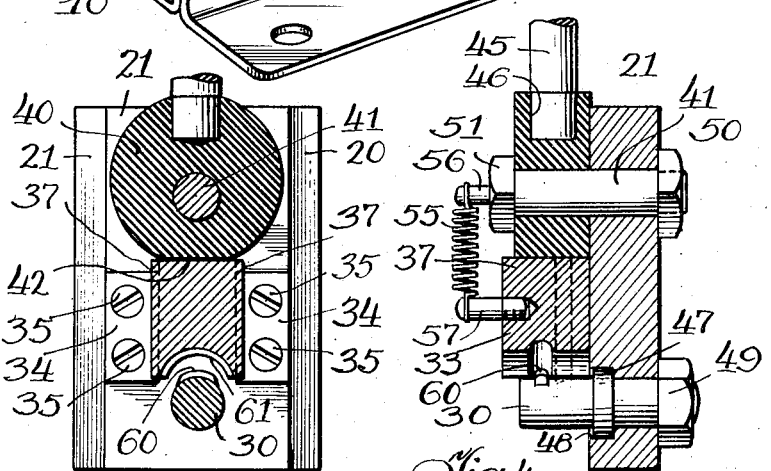
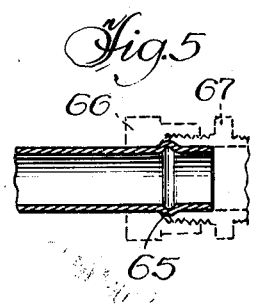
Inventor
Charles V. Dewar Patented Apr. 16, 1940

2,197,099

UNITED STATES PATENT OFFICE 2,197,099

PIPE BEADING APPARATUS

Charles V. Dewar, Chicago, Ill.

Application September 6, 1938, Serial No. 228,524

1 Claim. (Cl. 153—48)

This invention relates to improvements in tube or pipe beading apparatus particularly adapted for use with thin-wall tubing of the kind used for electric wiring. Such thin-wall tubing is extensively used as conduits for electric wiring, but the Underwriters Laboratory prohibits the use of threads at the ends of such thin-wall tubes for connection with couplings or other fittings. Moreover the Underwriters Laboratory requirements are quite strict as to the amount of pulling stress that tube fittings or connections must withstand. Much effort has been directed toward the development of a satisfactory fitting connection for the ends of such thin-wall tubes that will give the required strength and yet will permit the tubes to be cut to proper length and applied easily and quickly by the electrician on the job.

In accordance with the present invention, I provide an improved apparatus or fixture designed to form a raised bead at a predetermined distance from the end of the tube after the tube has been cut to length on the job, and standard coupling members then applied to the end of the tube with a minimum of time and effort. The apparatus is of simple portable form so that it can be readily transported and utilized by the electrician, and includes a base or standard having means for detachably mounting a plurality of bead-forming fixtures of varying sizes, depending upon the size of tubing to be used on the job. The base or standard is also provided with an integral socket member having a plurality of hexagonal fitting sockets and holes therein adapted to assist in completing the connection between the tube and the threaded coupling sleeves associated therewith, as will hereinafter more fully appear.

The invention may best be understood by reference to the accompanying drawing, in which Fig. 1 is a perspective view of the apparatus including the base and beading fixture in assembled relation therewith.

Fig. 2 is a view similar to Fig. 1, but with the beading fixture removed.

Fig. 3 is a front view of the beading fixture with parts shown in vertical section.

Fig. 4 is a transverse section of beading fixture shown in Fig. 1.

Fig. 5 is a sectional view of the end of the tube after it has been operated upon by the beading apparatus and showing the coupling sleeves in dotted lines as applied thereto.

Fig. 6 is a perspective view of the tube showing the coupling sleeves in full lines as finally applied thereto.

Fig. 7 is a perspective view of a beading fixture interchangeable with and similar in all respects to the form of fixture shown in Figs. 1, 3 and 4, excepting that it is designed to handle a larger standard size of tubing.

In the embodiment of my invention illustrated in the drawing, the standard 10 comprises a base 11 and upright 12 having a U-shaped opening 13 therein for demountably receiving a tube bending fixture indicated generally at 14. In the form shown, the standard 10 is made up of a pair of L-shaped plates 15 and 16 secured back to back, as by welding, and having their margins 17 and 18 at opposite sides of the opening 13 flanged outwardly so as to form a pair of upright grooves 19, 19 for receiving lateral tongues 20, 20 of base plate 21.

At one side of the opening 13 on the upright portion of the standard 10 is mounted a block 22 having a plurality of hexagonal openings 23 and 24 cut therein and registering with round holes 25 and 26, respectively, extending through the standard 10, as clearly shown in Figs. 1 and 2. The hexagonal hole 23 and its adjacent round hole 25 are larger than the hexagonal opening 24 and adjacent hole 26, so as to accommodate a larger size of standard tube and coupling sleeve fittings as will hereinafter more fully appear.

The beading fixture shown in Figs. 1, 3 and 4 consists of the base plate 21 which has a mandrel 30 projecting from the front face thereof adjacent its bottom edge. A plunger 33 is disposed above said mandrel and guided for reciprocable movement toward and away therefrom in guide members 34, 34 fixed to the base plate 21 by screws 35, 35, and each having an inwardly extending tongue 36 engaged in grooves 37, 37 formed on opposite sides of said plunger. The plunger is operated by means of a cam member 40 rotatably mounted on a stud 41 fixed on the base plate 21 and projecting forwardly therefrom, as clearly shown in Fig. 4. The cam member has a relatively flat cam face 42 normally engaging the upper surface of the plunger 33 when the latter is disposed at its greatest distance from the mandrel 30. Said cam member is preferably mounted eccentrically on the stud 41 with its flat cam surface 42 disposed at the point of minimum radius of said cam member. Said cam member is rotated by a handle 45, herein connected to the cam member by insertion in a bore 46 on the periphery of said cam member opposite the flattened cam face 37.

The mandrel 30 is of slightly smaller diameter than the interior dimension of the standard size tubing on which the fixture is designed to operate, and is suitably secured to the base plate 21 as by means of an integral collar 47 fitting in a countersunk bore 48 and having a nut 49 threaded on the projecting rear end of said mandrel as clearly shown in Fig. 4. The stud 41 is secured to the base plate as by means of a nut 50 threaded on the projecting end of said stud, and has a head 51 on the outer end thereof engaging the outer face of the cam member 40. The plunger is normally made in raised position relative to the mandrel 30 by means of coil spring 55 connected at its upper end to a pin 56 projecting from the head 51 of stud 41, and pin 57 projecting from the front face of the plunger 33.

Adjacent the end of the mandrel 30 and at a fixed distance from the face of the base plate 21 is mounted an elongated die projection 60 disposed circumferentially of the mandrel and extending approximately one-fifth of the total circumference of said mandrel.

The lower face of the plunger is formed with a cooperating concave surface 61 on a radius somewhat larger than that of the mandrel 30 so as to conform substantially with the exterior surface of a standard size of tubing to be operated upon. A transverse groove 62 is formed in the lower surface of the plunger opposite the die projection 60 on the mandrel, said groove being substantially wider and deeper than said projection so as to form a raised bead or rather a section of a bead on the end of a tube when the latter is placed on the mandrel and the plunger is depressed by manual operation of the handle 45. By rotating the tube on the mandrel into a succession of angular positions, a continuous bead may thus be formed thereon as indicated at 65 in Fig. 5.

The use and operation of my improved apparatus may now be described.

The standard 10 is suitably fixed on a board or other enlarged base which is preferably portable so as to be carried by the electrician to any part of the building or structure where he is working. The electric tubing is then cut to proper lengths in the usual manner, and a fixture 14 having a mandrel and cooperating plunger of the proper size to accommodate the particular standard form of tubing being employed, is mounted in the standard as shown in Fig. 1. After the tubing has been cut to length, a threaded female coupling member 66 is placed on the body of the tube. The tube is then placed over the mandrel 30 with its outer end engaging the base plate 21 so as to insure the proper position of the bead relative to the tube. The handle 45 is then manipulated to depress the plunger and form a segmental portion of a bead on the upper surface of the tube. The tube may then be rotated to another position so as to continue the bead formation about the entire circumference of the tube, as indicated at 65 in Fig. 5.

While in most cases it is desirable to form a bead about the entire circumference, under some circumstances two or more bead sections may be sufficient for the purpose, provided the raised bead extends over a substantial portion of the circumference on opposite sides of the tube.

After the tube is beaded as shown in Fig. 5, the coupling connections are then completed as by drawing the female coupling member 66 against the inner face of the bead 65 and threading it with a male coupling member 67, also of standard form, as indicated in dotted lines in this figure. To assist in this coupling operation the hexagonal portion 68 of the male coupling member 67 is adapted to be inserted in the proper hexagonal hole 23 or 24 on the standard 10 at one side of the beading fixture, with the threaded portion 69 of said coupling member extending through the hole 25 or 26, as the case may be. With this arrangement it is only necessary to place the tube with its female coupling member 66 against the end of the male coupling member 67 while seated in its recess, and screw the female member home with a single wrench while held in this position. The beading and coupling operation may, therefore, be completed with a minimum of time and effort, with the use of but a single wrench, or similar tool.

It will be understood that when tubing of different size, as for instance a somewhat larger size requiring a mandrel 30ª and cooperating plunger 33ª as shown in Fig. 7, is to be beaded, the fixture 14 may be removed from the standard, and the fixture 14ª inserted in its place.

Although I have shown and described one embodiment of my invention, it will be understood that I do not wish to be limited to the exact construction shown and described, but that various changes and modifications may be made without departing from the spirit and scope of my invention as defined in the appended claim.

I claim as my invention:

In a tube beading apparatus, a self-contained portable unit comprising a base plate, a mandrel fixed on and projecting from one face of said plate to receive the end of a tube thereon, a plunger reciprocably mounted on said base plate for movement relative to said mandrel, said mandrel and plunger having cooperating surfaces for forming a circumferentially extending boss on said tube, a stud fixed to said base plate above said plunger, an eccentric cam member rotatably mounted on said stud with its inner face bearing against said base plate and with its cam surface directly engaging said plunger, a coil spring secured between the adjacent end of said plunger and the outer end of said stud normally retracting said plunger from said mandrel, and a handle for rotating said eccentric cam member.

CHARLES V. DEWAR.